US009153077B2

(12) United States Patent
Healey et al.

(10) Patent No.: US 9,153,077 B2
(45) Date of Patent: Oct. 6, 2015

(54) SYSTEMS AND METHODS FOR COLLECTING VEHICLE EVIDENCE

(71) Applicant: Intel Corporation, Santa Clara, CA (US)

(72) Inventors: Jennifer A. Healey, San Jose, CA (US); Alexandra C. Zafiroglu, Portland, OR (US); Carlos R. Montesinos, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 13/690,708

(22) Filed: Nov. 30, 2012

(65) Prior Publication Data

US 2014/0156104 A1 Jun. 5, 2014

(51) Int. Cl.

| | |
|---|---|
| ***G06F 7/00*** | (2006.01) |
| ***G07C 5/00*** | (2006.01) |
| *G07C 5/08* | (2006.01) |
| *G08G 1/017* | (2006.01) |

(52) U.S. Cl.

CPC *G07C 5/00* (2013.01); *G07C 5/008* (2013.01); *G07C 5/085* (2013.01); *G08G 1/017* (2013.01)

(58) Field of Classification Search

CPC ........... B60T 8/172; B60Q 1/00; B60W 30/08
USPC ........................ 701/1, 36-39; 340/436; 360/5
See application file for complete search history.

(56) References Cited

U.S. PATENT DOCUMENTS

| | | | | |
|---|---|---|---|---|
| 7,271,716 | B2 * | 9/2007 | Nou | 340/539.13 |
| 2008/0147266 | A1 * | 6/2008 | Plante et al. | 701/35 |
| 2011/0291825 | A1 | 12/2011 | Al-Sayegh | |

FOREIGN PATENT DOCUMENTS

| | | | |
|---|---|---|---|
| KR | 10-0767310 | B1 | 10/2007 |
| KR | 10-2009-0040622 | A | 4/2009 |
| KR | 10-2012-0066393 | A | 6/2012 |
| KR | 10-2012-0067175 | A | 6/2012 |

OTHER PUBLICATIONS

International Search Report and Written Opinion received for PCT Patent Application No. PCT/US2013/048186, mailed on Sep. 26, 2013, 16 pages.

* cited by examiner

*Primary Examiner* — Thomas G Black
*Assistant Examiner* — Luke Huynh
(74) *Attorney, Agent, or Firm* — Sutherland Asbill & Brennan LLP

(57) ABSTRACT

Systems and methods to request and collect evidence elements from one or more evidence systems responsive to a triggering event are disclosed. An evidence request beacon may be generated based at least in part on information associated with the triggering event. The evidence request beacon may be received by one or more evidence systems and may be evaluated to determine if potentially relevant evidence is available from the evidence system. If potentially relevant evidence elements are available from the one or more evidence systems, then the potentially relevant evidence elements may be provided to the requesting system.

23 Claims, 6 Drawing Sheets

SYSTEMS AND METHODS FOR COLLECTING VEHICLE EVIDENCE

TECHNICAL FIELD

This invention generally relates to systems and methods for collecting evidence, and more particularly, vehicle-related evidence.

BACKGROUND

Vehicles, such as cars, may have one or more sensors and may have the capability to evaluate signals from those sensors to detect an unusual event, such as a break-in or a road accident. The car may therefore be able to indicate an unusual event to a user/driver of the vehicle.

In certain regions of the world, there may be evidentiary systems, such as video cameras, on or in proximity to roads. These evidentiary systems may be in the form of physical infrastructure, such as cameras on a side of the road. Alternatively, the evidentiary systems may be part of the cars that are on the roads.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
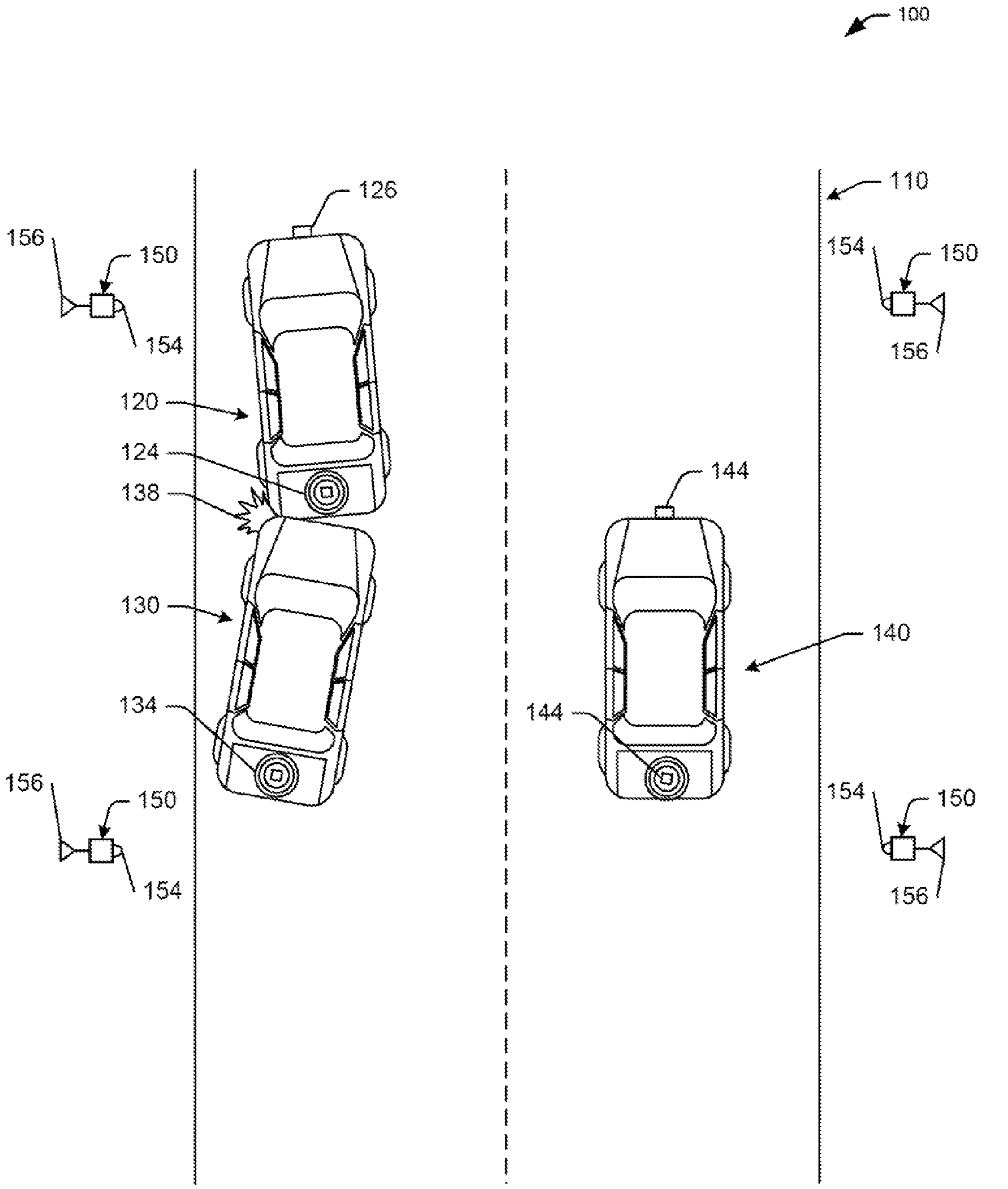
FIG. 1 is a simplified schematic diagram of an example roadway system configured to detect a triggering event and collect vehicle evidence in accordance with embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure may provide systems, methods, and apparatus for detecting a triggering event for a vehicle and requesting and/or receiving evidence related to the triggering event. The systems and methods disclosed herein may be useful for gathering evidentiary elements associated with an unusual event in a vehicular environment. In some cases, the evidence acquired using the systems and methods disclosed herein may be used, for example, for the purposes of determining the cause of an unusual vehicular event, for determining culpability associated with a vehicular event, and/or for providing evidence in legal and/or negotiation proceedings associated with the triggering event.

For the purposes of this disclosure, the triggering event may be any variety of unusual event associated with the vehicle or the roads on which the vehicle is present. For example, the triggering event may be a detected break-in or theft of the vehicle, an accident, a tire blowout, an unusually rapid deceleration, an airbag deployment, structural damage to the vehicle, or the like. The triggering event may be detected by a variety of hardware and/or software provided on the vehicle. The detection of the triggering event may entail receiving one or more sensor signals by one or more processors, such as processors associated with an in-vehicle infotainment (IVI) system of the vehicle. The one or more processors may be configured to process and/or analyze the one or more sensor signals to determine if a triggering event has occurred. The one or more sensor signals may be generated by the one or more sensors provided on the vehicle and configured to measure and/or detect a variety of environmental phenomena. The one or more sensors may include, for example, accelerometers, image sensors, microphones, tire pressure detectors, security systems, vibrational detectors, crumple zone sensors, or the like. Each of the one or more sensors may be configured to provide a particular signal to the one or more processors that may be used individually or in conjunction with other sensor signals to make a determination of whether a triggering event has occurred. For example, a relatively high level of g-force detected by an accelerometer of the vehicle may be indicative of a sudden stop that may be a signature of an accident. Therefore, if the one or more processors of the vehicle detect a level of g-force above a predetermined threshold level from the one or more accelerometers provided on the vehicle, then the one or more processors may determine that the vehicle has been involved in an accident.

In certain embodiments of the disclosure, once a triggering event has been detected, the one or more processors provided on the vehicle may receive one or more sensor signals associated with acquiring evidence from the one or more sensors provided on the vehicle. In this case, sensors and/or signals may be any variety of suitable sensors and/or signals, such as global positioning satellite (GPS), accelerometer, microphone, radar, LIDAR, sonar, image sensor, or the like.

Once the one or more processors have acquired evidence from the one or more sensors provided in and/or on the vehicle, the one or more processors may attempt to acquire additional evidence from entities external to the vehicle. In certain embodiments, the one or more processors may generate an evidence request beacon and transmit the evidence request beacon, such as in a wireless mechanism, to one or more external entities configured to receive the evidence request beacon. The evidence request beacon may carry a variety of suitable information, such as an identifier of the vehicle, a location of the vehicle, and/or a variety of monetary amounts corresponding to one or more payments that may be made for receiving suitable evidence. The evidence request beacon may be transmitted by one or more processors of the vehicle using any suitable standard medium of communication, such as any variety of wireless communications. In certain embodiments, the evidence request beacon may be transmitted in the form of a dedicated short-range communications (DSRC) beacon. The evidence request beacon may further be transmitted in the form of one or more data packets with communications elements associated therewith, such as headers and/or parity bits. In these and other embodiments, the evidence request beacon may be transmitted by the one or more processors via an antenna provided on the vehicle. The evidence request beacon may be received, in some cases, by one or more infrastructural entities that may be configured for providing evidentiary elements. In other cases, the evidence request beacon may be received by one or more other vehicles on the roadway that are configured to provide evidentiary elements. The evidence request beacon, in certain embodiments, may be received by the receiving entity via one or more antennas associated with the receiving entity. For example, the evidence request beacon may be received by another vehicle via an antenna provided on that other vehicle. Once received, the receiving entity may be configured to process the evidence request beacon and the information carried thereon.

Responsive to receiving the evidence request beacon, one or more evidence systems, such as those on either infrastructural entities or other vehicles, may be configured to provide evidence elements to the evidence requesting vehicle and the one or more processors associated with the evidence request beacon. In certain embodiments, the one or more evidence systems may directly transmit one or more evidence elements to the requesting vehicle and the one or more evidence elements may be received by the requesting vehicle via one or more antennas provided thereon. In certain other embodiments, one or more evidence systems may upload evidence elements to a remote server that may be accessed by the owner and/or user of the requesting vehicle. The one or more evidence systems may, in certain embodiments, ascertain the location of the requesting vehicle from information carried by the evidence request beacon. Based at least in part on the location of the requesting vehicle, the one or more evidence systems may determine if relevant and/or useful evidence elements are available and/or have been captured by the one or more evidence systems. In certain other embodiments, the one or more evidence systems may offer to provide evidence elements responsive to an evidence request beacon, and subsequently the requesting vehicle and/or the owner and/or user thereof may decide if he/she is willing to purchase the offered evidence elements.

In certain embodiments, one or more evidence systems may provide one or more evidence elements to a requesting vehicle responsive to an evidence request beacon based at least in part on compensation offered for the one or more evidence elements. In certain cases, the one or more evidence systems may provide pricing associated with evidence elements that may be of use to the requesting vehicle and the associated owner and/or user. In these cases, the owner and/or user of the requesting vehicle may decide to acquire the evidence elements from a particular evidence system based at least in part on the pricing of the evidence elements offered by the evidence system. Indeed, in certain embodiments, the price paid for evidence elements may be negotiated between the requester and the provider of the evidence elements. In these embodiments, in some cases, the negotiation process may be facilitated by a third party such as an entity that controls a remote server that may serve as an exchange for the evidence elements.

Example embodiments of the disclosure will now be described with reference to the accompanying figures.

Referring now to FIG. 1, an example roadway system 100 configured to detect a triggering event and collect vehicle evidence in accordance with embodiments of the disclosure is discussed. The roadway system 100 may include a road 110 with one or more vehicles 120, 130, 140 thereon. The roadway system 100 may further include one or more evidence systems 150 in relative proximity to the road 110. This roadway system 100 or one or more of the vehicles 120, 130, 140 may be configured to detect a triggering event, such as a collision 138, and responsive to the triggering event may generate and transmit an evidence request beacon.

The vehicle is depicted herein as a car on a road 110. However, it will be appreciated that in some embodiments of the disclosure, the vehicle may include, but is not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, or any other suitable vehicle. Further, it will be appreciated that embodiments of the disclosure may also be utilized in other environments, such as non-vehicular environments, where evidence elements may be requested responsive to the detection of a triggering event. It also should be noted that although particular evidence elements and/or particular sensor signals from particular sensors may be discussed herein, embodiments of the disclosure include any variety of evidence elements including video, images, sound, mechanical sensor readings, system deployment readings, and/or mechanical deformation readings.

The vehicles 120, 130, 140 may include one or more sensors 126, 144 disposed thereon. The sensors 126, 144 may be configured to detect a variety of suitable conditions and/or events associated with the respective vehicles 120, 130, 140. In certain embodiments, the sensors 126, 144 may include location-indicating sensors such as global positioning satellite (GPS) systems providing an indication of the location of the corresponding respective vehicles 120, 130, 140. In the same or further embodiments, the sensors 126, 144 may include relative location-indicating sensors that may indicate the location of the corresponding respective vehicles 120, 130, 140 relative to other physical structures, such as other vehicles 120, 130, 140. Non-limiting examples of the sensors 126, 144 may include light detection and ranging (LIDAR) sensors, radio detection and ranging (RADAR) sensors, sound navigation and ranging (SONAR) sensors, speed detectors, microphones, and/or image sensors. It will be understood that the terms LIDAR, RADAR, and/or SONAR sensors, as used herein, may include both an appropriate transducer and a receiver. The sensors 126, 144 may further include any variety of suitable vehicular state sensors including, but not limited to, air bag deployment sensors that may detect if an airbag has been deployed in the vehicles 120, 130, 140, crumple zone deformation sensors that may detect damage to the structure of the vehicles 120, 130, 140, one or more accelerometers that may detect sudden changes in velocity of the vehicles 120, 130, 140, or the like.

The vehicles 120, 130, 140 and the processors disposed thereon may be configured to acquire evidence from the sensors 126, 144 upon detection of a triggering event, such as a collision 138. Other triggering events may include detection of a possible theft or break-in involving the vehicles 120, 130, 140, detection of possible structural damage to the vehicles 120, 130, 140, detection of a sudden deceleration or acceleration of the vehicles 120, 130, 140, detection of a sudden change in direction of the vehicles 120, 130, 140, or the like. Any evidence, such as from sensors 126, 144, acquired by the vehicles 120, 130, 140 and the processors thereon may be stored in memory, either on the vehicles 120, 130, 140 or at a remote location. The vehicle may further be configured to acquire evidence from sources and/or signals external to the vehicles 120, 130, 140, such as from other vehicles 120, 130, 140 on the road 110 or other evidence system 150 on the road 110.

The vehicles 120, 130, 140 may, therefore, be configured to transmit an evidence request beacon to request evidence from entities external to the vehicles 120, 130, 140 that has detected the triggering event. The vehicles 120, 130, 140 may have one or more antennas 124, 134, 144, respectively, disposed thereon to communicate the evidence request beacon and/or receive the evidence request beacon. The evidence request beacon may be transmitted in the form of any suitable beacon, such as a dedicated short-range communication (DSRC). Other formats and/or protocols of beacons may include Wi-Fi, direct Wi-Fi, Bluetooth, 3G mobile communication, 4G mobile communication, long-term evolution (LTE), WiMax, or the like. The evidence request beacon may carry a variety of information thereon, including the location, such as GPS coordinates where the triggering event occurred and/-or the location of the vehicles 120, 130, 140, an identifier of the vehicles 120, 130 140, one or more descriptions of the vehicles 120, 130, 140, or the like. The vehicles 120, 130, 140 may also be configured to receive the evidence request beacon via their respective antennas 124, 134, 144. The vehicles 120, 130, 140 and processors and/or in-vehicle infotainment systems may be configured to provide evidence elements responsive to receiving an evidence request beacon from another vehicle 120, 130, 140. In certain embodiments, the evidence elements may be communicated wirelessly via the antennas 124, 134, 144 of the respective vehicles 120, 130, 140.

There may be any number of evidence systems 150 on or near the roadway system 100. The evidence systems 150 may be configured to collect any suitable type of evidence including, but not limited to, still images, video, audio, speed information, acceleration information, or the like. Examples of evidence systems may include roadway cameras, camcorders, radar and/or laser speed detectors, microphones, or the like. The example evidence systems 150 depicted may include an image sensor 154 and an antenna 156 for communications. In one aspect, the antenna 156 may enable the evidence system 150 to communicate evidence elements, such as evidence elements collected by image sensor 154, via wireless channel(s). In certain embodiments, the evidence system 150 may be configured to communicate one or more evidence elements directly to the vehicles 120, 130, 140, such as a vehicle that has transmitted an evidence request beacon. In the same or other embodiments, the evidence system 150 may be configured to communicate one or more evidence elements to a remote server that may be accessed by entities affiliated with the vehicle where a triggering event (collision) 138 is detected.

Figure 2:
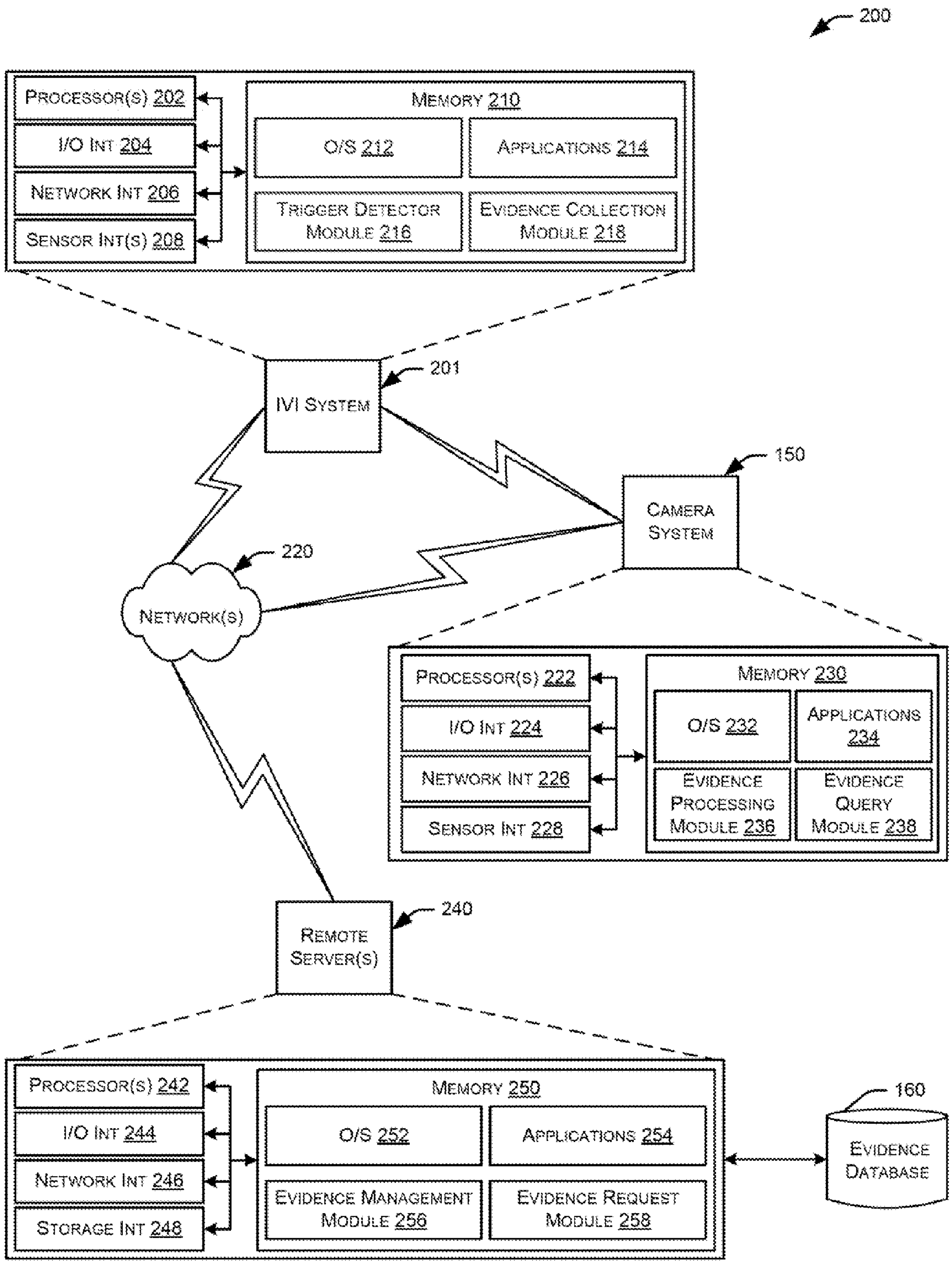
FIG. 2 is a simplified block diagram illustrating an example architecture for collecting vehicle evidence in accordance with embodiments of the disclosure.

Referring now to FIG. 2, an example architecture 200 for collecting vehicle evidence in accordance with embodiments of the disclosure is discussed. The architecture 200 may include an IVI system 201 associated with and/or disposed on/in the vehicles 120, 130, 140, the evidence system 150 in the form of a camera system 150, one or more networks 220, and/or one or more remote servers 240. In certain embodiments, systems other than the IVI system 201 may perform the methods and functions described herein. For example, general control systems of the vehicles 120, 130, 140, airbag deployment systems, collision detection systems, or the like may perform functions as described here.

The IVI system 201 may include one or more processors 202, one or more input/output (I/O) device interfaces 204, one or more network interface(s) 206, one or more sensor interface(s) 208, and/or one or more memories 210.

In some examples, the processors 202 of the IVI system 201 may be implemented as appropriate in hardware, software, firmware, or combinations thereof. Software or firmware implementations of the processors 202 may include computer-executable or machine-executable instructions written in any suitable programming language to perform the various functions described. Hardware implementations of the processors 202 may be configured to execute computer-executable or machine-executable instructions to perform the various functions described. The one or more processors 202 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The IVI system 201 may also include a chipset (not shown) for controlling communications between the one or more processors 202 and one or more of the other components of the IVI system 201. The one or more processors 202 may also include one or more application-specific integrated circuits (ASICs) or application-specific standard products (ASSPs) for handling specific data processing functions or tasks. In certain embodiments, the IVI system 201 may be based on an Intel® Architecture system, and the one or more processors 202 and chipset may be from a family of Intel® processors and chipsets, such as the Intel® Atom® processor family.

The input/output (I/O) device(s) or user interface(s), such as a touch sensitive display screen, may be controlled via the one or more I/O device interfaces 204. The network interfaces (s) 206 may allow the user device to communicate via one or more networks network(s) 220 and/or via other suitable communicative channels. For example, the IVI system 201 may be configured to communicate with stored databases, other computing devices or servers, user terminals, other devices on the networks 220, and/or repositories of evidence elements. The sensor interface(s) 208 may enable the IVI system 201 to receive and interpret signals from the one or more sensors, such as sensors 126, 144.

The memory 210 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 202, as well as data generated or received during the execution of these programs. Turning to the contents of the memory 210 in more detail, the memory 210 may include one or more operating system (O/S) modules 212, an applications module 214, a trigger detector module 216, and/or an evidence collection module 218. Each of the modules and/or software may provide functionality for the IVI system 201, when executed by the processors 202. The modules and/or the software may or may not correspond to physical locations and/or addresses in the memory 210. In other words, the contents of each of the modules 212, 214, 216, 218 may not be segregated from each other and may, in fact, be stored in at least partially interleaved positions on the memory 210.

The operating system module 212 may have one or more operating systems stored thereon. The processors 202 may be configured to access and execute one or more operating systems stored in the operating system module 212 to operate the system functions of the IVI system 201. System functions, as managed by the operating system, may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like. The applications module 214 may contain instructions and/or applications thereon that may be executed by the processors 202 to provide one or more services to the user. These instructions and/or applications, certain aspects, may interact with the operating system module 212 and/or other modules of the IVI system 201.

The trigger detector module 216 may have stored thereon instructions and/or programs that, when executed by the processors 202, may enable the IVI system 201 to provide a variety of functionality associated with identifying a triggering event. In one aspect, the processors 202 may be configured to receive one or more sensor signals from a variety of sensors, such as sensors 126, 144. These sensor signals may indicate the velocity, acceleration, pitch, yaw, or location of the vehicles 120, 130, 140. The sensor signals may alternatively and/or additionally indicate the distance of the vehicles 120, 130, 140 from another vehicle 120, 130, 140, if one or more air bags have deployed, if there is structural damage to the vehicles 120, 130, 140, if there is a sudden change in velocity, if there is a theft of, or from, the vehicles 120, 130, 140, or the like. The processors 202 may be configured to receive the sensor 126, 144 signals and apply one or more rules and/or algorithms to ascertain if a triggering event has occurred. In one aspect, a triggering event may constitute an event that has occurred to the vehicles 120, 130, 140, for which the users, drivers, and/or owners of the vehicles 120, 130, 140 may want to collect evidence elements that show the occurrence of the triggering event. For example, if the triggering event is a collision 138, as depicted in FIG. 1, the vehicles 120, 130, 140 and the entities associated therewith, such as the user, driver, and/or owner of the vehicles, may want to collect still image, video, and speed detection evidence associated with the time and location of the collision 138. In certain embodiments, the processors 202 may receive and process one or more accelerometer signals that may be indicative of a triggering event in the form of the collision 138. In the same or other embodiments, the processors 202 may receive and process one or more structural sensor signals that may be indicative of structural damage to the vehicles 120, 130, 140 as a result of a triggering event in the form of the collision 138. Further, in the same or other embodiments, the processors 202 may receive and process one or more air bag deployment signals that may be indicative of a deployment of one or more air bags of the vehicles 120, 130, 140 as a result of a triggering event in the form of the collision 138. Further still, in other embodiments, the processors 202 may receive one or more sensor signals that may indicate a triggering event in the form of a break-in into the vehicles 120, 130, 140.

The evidence collection module 218 may have stored thereon instructions and/or programs that, when executed by the processors 202, may enable the IVI system 201 to provide a variety of functionality associated with the collection of evidence elements. In one aspect, by running the instructions stored in the evidence collection module 218, the processors 202 may be configured to gather evidence from in-vehicle sensors as well as request evidence elements from entities external to the vehicles 120, 130, 140. The processors 202 may, therefore, collect evidence elements from the sensors on the vehicle, store the evidence elements in the memory 210, or upload the evidence elements to other entities, such as the remote servers 240. In certain embodiments, the evidence elements may be uploaded to the remote server 240 by the processors 202 in a relatively short period after the detection of the triggering event to prevent potential allegations of tampering with the evidence elements. The processors 202 may be configured further to generate an evidence request beacon responsive to detecting the triggering event. The evidence request beacon may be transmitted via any variety of channels, communicative links, and/or communications protocols, such as DSRC via antennas 124, 134, 144. Additionally, the processors 202 may be configured to receive evidence elements responsive to the transmitted evidence request beacon. In these cases, the evidence elements may be carried by one or more data packets and may be received wirelessly via the antennas 124, 134, 144. In the same or other embodiments, upon transmission of the evidence request beacon, evidence elements may be transmitted to the remote server 240 by one or more evidence systems 150 or other vehicles 120, 130, 140.

In certain embodiments, the evidence request beacon, as generated by the processors 202 by executing instructions that may be stored in the evidence collection module 218, may be configured to carry information associated with one or more pricing amounts. These pricing amounts may be associated with prices that the users, drivers, and/or owners of the vehicles 120, 130, 140 are willing to pay for evidence elements. In other words, the requester of the evidence elements may be willing to compensate the provider of the evidence elements according to a particular pricing model. For example, particularly useful evidence elements may be compensated at a relatively higher value than relatively less useful evidence elements. Furthermore, particular types of evidence elements may be priced at different tiers. For example, video evidence may be priced at a higher value than still pictures or audio evidence elements. Therefore, in this example, the requester of evidence elements may pay a greater amount of money for video-based evidence than for still pictures or audio-based evidence.

In further embodiments, the processors 202 may be configured to provide locational information and/or temporal information in the evidence request beacon associated with the triggering event. The locational and/or temporal information may be used by evidence systems 150 or other vehicles 120, 130, 140 to provide evidence elements that correspond to the location and/or time where the triggering event might have occurred. The location information may be, for example, relative position information to a particular landmark or evidence system 150 or an absolute position, such as GPS coordinates corresponding to the location where the triggering event occurred and/or the present location of the vehicle 120, 130, 140. The temporal information may be an absolute time, such as a satellite navigation system calibrated time, indicating when a particular triggering event had occurred and/or was detected.

In yet further embodiments, by executing the instructions stored in the evidence collection module 218, the processors 202 may be configured to access requested evidence elements from the remote servers 240. In certain cases, requested evidence elements may be provided to the remote server 240 instead of, or in addition to, providing the evidence elements directly to the IVI system 201. Therefore, the IVI system 201, the processors 202 thereon, and/or the entities associated therewith may be configured to access the evidence elements associated with the vehicles 120, 130, 140 directly from the remote servers 240 via networks 220 or other suitable communicative links. It should be noted, however, that the IVI system 201 may be just one of many devices from which an entity associated with the triggering event may access requested evidence elements. For example, the users, drivers, and/or owners of the vehicles 120, 130, 140 may access the requested evidence elements stored on the remote server 240 via a user device such as a laptop computer, a tablet computer, or a smartphone. The IVI system 201 or other user devices may access evidence elements stored on the remote server 240 by a variety of suitable mechanisms via the networks 220 or other suitable communicative links. For example, evidence elements may be accessed by a user associated with the vehicles 120, 130, 140 and the triggering event by setting up an account on the remote server 240 and logging into the account, for example, by providing authentication credentials.

It will be appreciated that the IVI system 201 is an example system for the implementation of the evidence collection systems and methods disclosed herein. In certain embodiments, the one or more processors 202 and the functionality associated therewith may be independent of the IVI system 201. In other words, in some cases, the evidence collection system may be a separate entity from the IVI system in vehicles 120, 130, 140. Therefore, the one or more processors 202 may or may not be dedicated to the IVI system 201 for providing component control signals. Therefore, in such embodiments, the processors 202 may be separate from the IVI system 201. It also should be noted that the IVI system 201 and/or the processors 202 may be part of or otherwise associated with a main computer of the vehicles 120, 130, 140. The software associated with the IVI system 201 may further be stored on a server or a cloud server and may be transferred to the IVI system 201 of the vehicle via one or more of a wired connection, a wireless connection, a smart key, a universal serial bus (USB) drive, or the like.

It will be appreciated that there may be an overlap in the functionality of the instructions stored in the O/S module 212, the applications module 214, the trigger detector module 216, and/or the evidence collection module 218. In fact, the functions of the aforementioned modules 212, 214, 216, 218 may interact and cooperate seamlessly under the framework of the IVI system 201. Indeed, each of the functions described for any of the modules 212, 214, 216, 218 may be stored in any module 212, 214, 216, 218 in accordance with certain embodiments of the disclosure. Further, in certain embodiments, there may be one single module that includes the instructions, programs, and/or applications described within the O/S module 212, the applications module 214, the trigger detector module 216, and/or the evidence collection module 218.

The camera system 150, similar to the IVI system 201, may include one or more processors 222, one or more I/O device interfaces 224, one or more network interface(s) 226, one or more sensor interface(s) 228, and/or one or more memories 230. Each of these elements is similar to the respective corresponding elements, 202, 204, 206, 208, 210, and in the interest of brevity will not be repeated here.

The memory 230 may store program instructions that are loadable and executable on the processor(s) 222, as well as data generated or received during the execution of these programs. Turning to the contents of the memory 230 in more detail, the memory 230 may include one or more operating system (O/S) modules 232, an applications module 234, an evidence processing module 236, and an evidence query module 238. Each of the modules and/or software may provide functionality for the camera system 150, when executed by the processors 222. The modules and/or the software may or may not correspond to physical locations and/or addresses in the memory 230. In other words, the contents of each of the modules 232, 234, 236, 238 may not be segregated from each other and may, in fact, be stored in at least partially interleaved positions on the memory 210. The O/S module 232 and the applications module 234 of the camera system 150 may be substantially similar to the O/S module 212 and the applications module 214 of the IVI system 201, respectively. Therefore, in the interest of brevity, the descriptions of these modules are not repeated here.

The evidence processing module 236 may have instructions and/or software stored thereon that, when executed by the processors 222, may configure the camera system 150 to provide a variety of functionality related to processing evidence elements. In one aspect, the processors 222 may be configured to receive an evidence request beacon via antenna 156 and process the evidence request beacon to provide the requested information to the requesting entity, such as the vehicles 120, 130, 140 and/or users, drivers, and/or owners thereof. In certain embodiments, the evidence processing module 236 and the instructions stored thereon may be executed by the processors 222 to ascertain particular information about a triggering event and/or an associated evidence element request based at least in part on the evidence request beacon received by the camera system 150. The information ascertained from the evidence request beacon may include the type of triggering event, such as an accident or break-in; the location of the triggering event, such as GPS coordinates; the time of the triggering event; monetary payment(s) offered for various types of evidence; requester's identification; vehicle 120, 130, 140 identification; or the like. Based on this information, the processors 222 may provide evidence elements to the entity transmitting the evidence request beacon. For example, the processors 222 may assess whether the payment amounts are sufficient to provide the requested evidence elements.

The camera system 150 and the processors 222 thereon may further execute instructions stored in the evidence processing module 236 to generate an evidence message that may be transmitted via the antenna 156 directly to the requesting vehicles 120, 130, 140 via their respective corresponding antennas 124, 134, 144. The evidence message may be in the form of one or more data packets and may carry potential evidence as requested in the evidence request beacon. In certain embodiments, the camera system 150 may err on the side of providing possible relevant evidence elements, even if it is not certain that the evidence element provided is relevant. In these cases, the receiving party may ascertain if the provided evidence elements are relevant. In these embodiments, in certain cases, upon an assessment of relevance, the evidence requesting entity, such as the IVI system 201, may provide and/or authorize an appropriate payment for the evidence elements received.

In alternative embodiments, the camera system 150 and the processors 222 thereon, by executing instructions stored in the evidence processing module 236, may directly upload potentially relevant requested evidence elements to the remote server 240. An entity requesting evidence elements may choose to have potentially relevant evidence elements provided to the remote server 240 if the requesting entity wants to have third-party verification of the authenticity and/or integrity of the evidence elements provided by the camera system 150. For example, by the camera system 150 uploading evidence elements, such as video or still pictures, relatively shortly after the detection of a triggering event (collision) 138 and having those evidence elements archived by the remote server 240, it may be determined that it is relatively unlikely that the requester of the evidence element modified and/or tampered with the evidence elements provided by the camera system 150. In these cases, the potentially relevant evidence elements may be provided to the remote server 240 via wireless communicative channels to connect to the networks 220, such as via antenna 156, or via hard wired communicative links to the networks 220.

In yet further embodiments, the camera system 150 and the processors 222 thereon, by executing instructions stored in the evidence processing module 236, may upload potentially relevant requested evidence elements to the remote server 240 responsive to a request for evidence message provided by the remote server 240 to the camera system 150 via the networks 220 or other suitable communicative links. In these cases, a user associated with the vehicles 120, 130, 140 and the triggering event may access an account on the remote servers 240, such as by providing authentication credentials to login and subsequently place a request for evidence elements. This action may generate an evidence request message that may be processed by the camera system 150 to provide potentially relevant evidence. Relevance of the evidence, as used herein, may refer to evidence elements that may have a relatively useful purpose for the requester of the evidence element. However, it may not be known with certainty if the evidence element being provided is of use at the time that the camera system 150 may be providing the evidence element. Therefore, at the time when the evidence elements are being provided, the evidence elements are of potential relevance and/or usefulness to the requester of the evidence.

The evidence query module 238 may have instructions and/or software stored thereon that, when executed by the processors 222, may configure the camera system 150 to provide a variety of functionality related to querying evidence elements. The processors 222 may be configured to determine, based on information associated with the triggering event, if potentially relevant evidence elements are available from the camera system 150. In some cases, the evidence elements may be generated in substantially real-time and stored in memory 230 at the camera system 150 or at remote storage locations, such as the remote server 240. The functions performed by the processors 222 by executing instructions stored in the evidence query module 238 may cooperate to ascertain information, such as time and location, associated with a triggering event, such as by analyzing an associated evidence request beacon. Based at least in part on this information, the processors 222 may determine if the current collection of sensor data may be potentially relevant evidence elements. The processors 222 may further determine, based at least in part on the information associated with the triggering event, whether relevant evidence elements may be stored in the memory 230 of the camera system 150. If possibly relevant evidence elements are identified by the processors 222, by executing the instructions stored in the evidence query module 238, then those evidence elements may be provided either to the requesting entity and/or to the remote server 240.

It will be appreciated that there may be an overlap in the functionality of the instructions stored in the O/S module 232, the applications module 234, the evidence processing module 236, and/or the evidence query module 238. In fact, the functions of the aforementioned modules 232, 234, 236, 238 may interact and cooperate seamlessly under the framework of the camera system 150. Indeed, each of the functions described for any of the modules 232, 234, 236, 238 may be stored in any module 232, 234, 236, 238 in accordance with certain embodiments of the disclosure. Further, in certain embodiments, there may be one single module that includes the instructions, programs, and/or applications described within the O/S module 232, the applications module 234, the evidence processing module 236, and/or the evidence query module 238.

The remote servers 240, similar to the IVI system 201 and/or the camera system 150, may include one or more processors 242, one or more I/O device interfaces 244, one or more network interface(s) 246, one or more storage interface (s) 248, and/or one or more memories 250. Elements 242, 244, and 246 are similar to the respective corresponding elements, 202, 204, 206, 208 and in the interest of brevity will not be repeated here. The storage interfaces 248 may be any variety of hardware and/or software associated with providing functionality associated with interfacing with the storage devices, such as evidence database 160. The storage interfaces 248 may, in certain embodiments, be drivers and/or controllers for controlling, writing to, and/or reading from one or more external storage devices.

The memory 250 may store program instructions that are loadable and executable on the processor(s) 242, as well as data generated or received during the execution of these programs. Turning to the contents of the memory 250 in more detail, the memory 250 may include one or more operating systems (O/S) 252, an applications module 254, an evidence management module 256, and an evidence request module 258. Each of the modules 252, 254, 256, 258, and/or software may provide functionality for the remote servers 240, when executed by the processors 242. The modules and/or the software may or may not correspond to physical locations and/or addresses in the memory 250. In other words, the contents of each of the modules 252, 254, 256, 258 may not be segregated from each other and may, in fact, be stored in at least partially interleaved positions on the memory 250. The O/S module 252 and applications module 254 of the remote servers 240 may be substantially similar to the O/S module 212 and the applications module 214 of the IVI system 201, respectively and, therefore, in the interest of brevity the descriptions of these modules will not be repeated here.

The evidence management module 256 may have instructions and/or software stored thereon that, when executed by the processors 242, may configure the remote servers 240 to provide a variety of functionality related to receiving and organizing evidence elements. In one aspect, the processors 242 may receive evidence elements, such as from the camera system 150 and/or other vehicles 120, 130, 140. The evidence elements may be received via the networks 220 in the form of one or more data packets. The evidence elements may have an identifier, such as a user and/or vehicle identifier associated therewith. These identifiers may be used to allocate the received evidence elements into one or more accounts associated with a particular user of the remote servers 240. For example, suppose that an evidence element identified as being associated with a particular vehicle 120, 130, 140 is received by the remote server 240, then the processors 242 may be configured to tag that evidence element to an account associated with a user associated with the particular vehicle. In other words, the received evidence elements at the remote server 240 may be segregated, based at least in part on an identifier associated with the evidence element, so that only the appropriate user may access the received evidence elements. The processors 242, by executing instructions stored in the evidence management module 256, may be configured further to store and/or retrieve the evidence elements on the memory 250 and/or the evidence database. Therefore, if an evidence element is requested by an authorized user that is logged into the remote server 240, then the processors 242 may be configured to verify the user's access to the requested evidence element and may provide the evidence element to the requesting user.

The processors 242, by executing instructions stored in the evidence request module 258, may be configured further to identify, retrieve, and/or provide evidence elements to an authorized user of the remote server 240. Therefore, the processors 242 may be configured to identify the location of the stored evidence element and provide the requested evidence element to the user. The evidence element may be provided to the user via the networks 220 or other suitable communicative channels.

It will be appreciated that there may be an overlap in the functionality of the instructions stored in the O/S module 212, the applications module 214, the trigger detector module 216, and/or the evidence collection module 218. In fact, the functions of the aforementioned modules 212, 214, 216, 218 may interact and cooperate seamlessly under the framework of the IVI system 201. Indeed, each of the functions described for any of the modules 212, 214, 216, 218 may be stored in any module 212, 214, 216, 218 in accordance with certain embodiments of the disclosure. Further, in certain embodiments, there may be one single module that includes the instructions, programs, and/or applications described within the O/S module 212, the applications module 214, the trigger detector module 216, and/or the evidence collection module 218.

Figure 3:
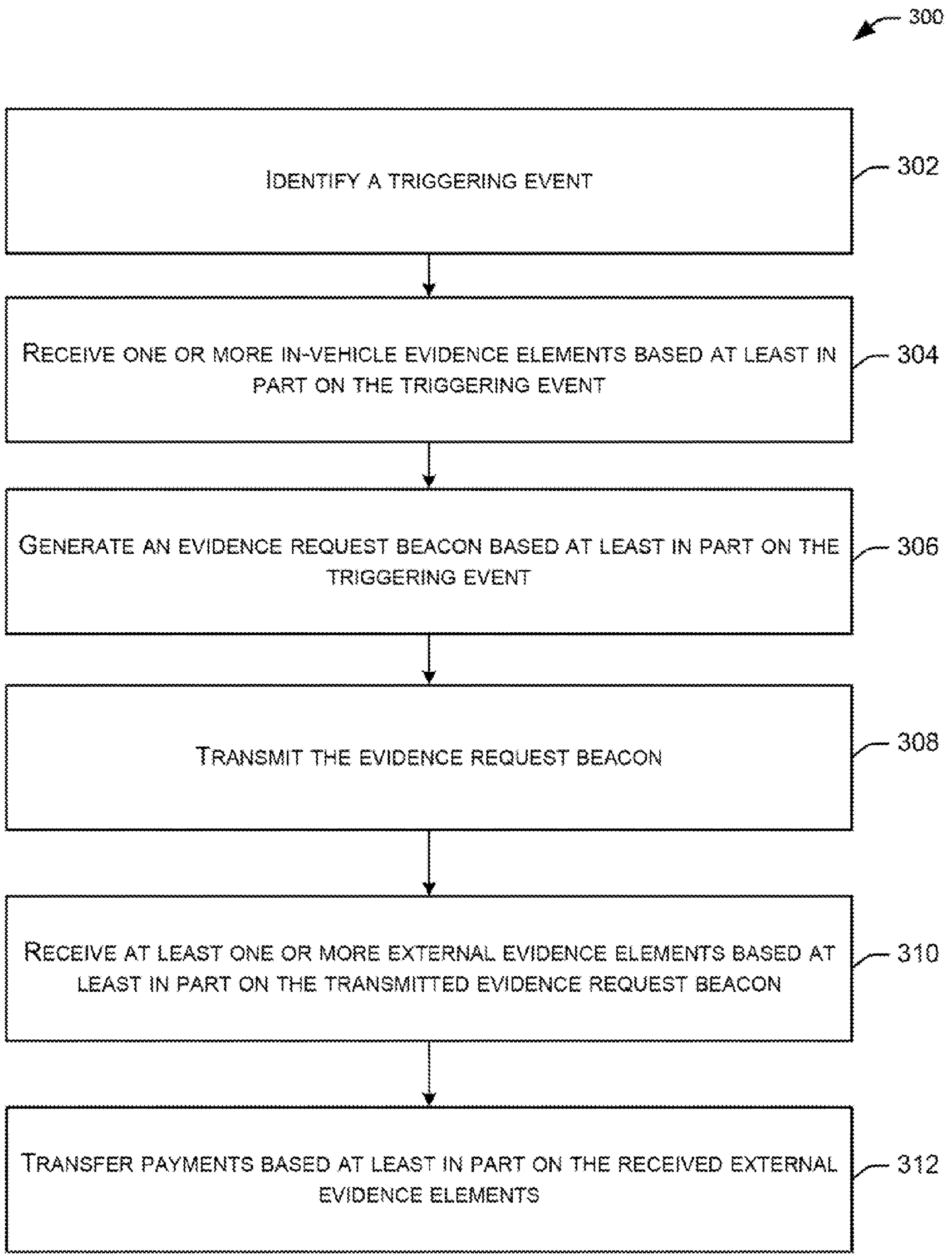
FIG. 3 is a flow diagram illustrating an example method of generating an evidence request beacon in accordance with embodiments of the disclosure.

Referring now to FIG. 3, an example method 300 for receiving external evidence elements and transferring payments in accordance with embodiments of the disclosure is described. Method 300 may be performed by the IVI system 201 and the processors 202 thereon or other suitable systems of the architecture 200. At block 302 a triggering event may be identified. Information related to the trigger event may also be identified. This information may include identifiers for the type of triggering event, the identity of the vehicles 120, 130, 140, and/or one or more monetary values that an evidence requesting entity is willing to pay for evidence elements.

At block 304, one or more in-vehicle evidence elements may be received based at least in part on the triggering event. These in-vehicle evidence elements may originate from sensors associated with the vehicles 120, 130, 140 with which the IVI system 201 is associated and requesting evidence. Therefore, the IVI system 201 may receive a variety of evidence elements, such as vehicle speed, distance to another vehicle 120, 130, 140 in front and/or behind, images from the front, rear, and/or side(s) of the vehicles 120, 130, 140, air bag deployment flags, crumple zone damage flags, or the like. Once received, the in-vehicle evidence elements and/or sensor data may be stored in the memory 210 and/or transmitted to the remote server 240.

At block 306, an evidence request beacon may be generated based at least in part on the triggering event. Information associated with the triggering event may be used to generate the evidence request beacon. The evidence request beacon may be generated by the IVI system 201 to request additional evidence elements from systems and entities, such as other vehicles 120, 130, 140 and/or evidence systems 150, external to the vehicles 120, 130, 140 with which the IVI system 201 is associated. The evidence request beacon may be in a standard format so that when the evidence request beacon is received by another vehicle 120, 130, 140 and/or an evidence system 150, the evidence request beacon may be parsed by the receiving entity to, at least in part, be able to determine if the receiving entity has potentially relevant evidence elements that may be requested from the evidence request beacon. The evidence request beacon may be in the form of one or more data packets containing a variety of information related to the type of evidence elements requested including, for example, the type of triggering event, prices offered for various evidence elements, and/or an identity of the vehicle 120, 130, 140 and/or evidence requesting entity, such as the owner of the vehicle 120, 130, 140. At block 308, the evidence request beacon may be transmitted. The evidence request beacon may be transmitted either via hardwire or via wireless channels. For example, the evidence request beacon may be transmitted wirelessly via DSRC or any other suitable communicative channel.

At block 310, at least one or more external evidence elements may be received based at least in part on the transmitted evidence request beacon. In certain embodiments, the evidence elements may be received wirelessly via antennas 124, 134, 144 in a variety of suitable formats and/or protocols including, for example, DSRC, Bluetooth, and/or Wi-Fi. In certain embodiments, one or more of the evidence elements may be uploaded to the remote server 240, instead of or in addition to transmitting to the IVI system 201. When uploaded to the remote server 240, the user requesting the evidence elements may interact with the remote server 240 to access the received evidence elements.

At block 312, payments for the received external evidence elements may be transferred based at least in part on the received external evidence elements. A debit from a financial account associated with the user requesting evidence elements may be initiated. A corresponding credit transaction may be initiated for an account associated with the entity providing the evidence elements. The mechanism of funds transfer for the evidence elements may be by any suitable mechanism including, but not limited to, debit card, credit card, wire transfer, automated clearinghouse (ACH) transfer, or the like. In certain embodiments, the funds transfer for payment for the evidence elements may be initiated upon verification that the received evidence elements are relevant and/or useful for providing information about the associated triggering event.

It should be noted, that the method 300 may be modified in various ways in accordance with certain embodiments of the disclosure. For example, one or more operations of the method 300 may be eliminated or executed out of order in other embodiments of the disclosure. Additionally, other operations may be added to the method 300 in accordance with other embodiments of the disclosure.

Figure 4:
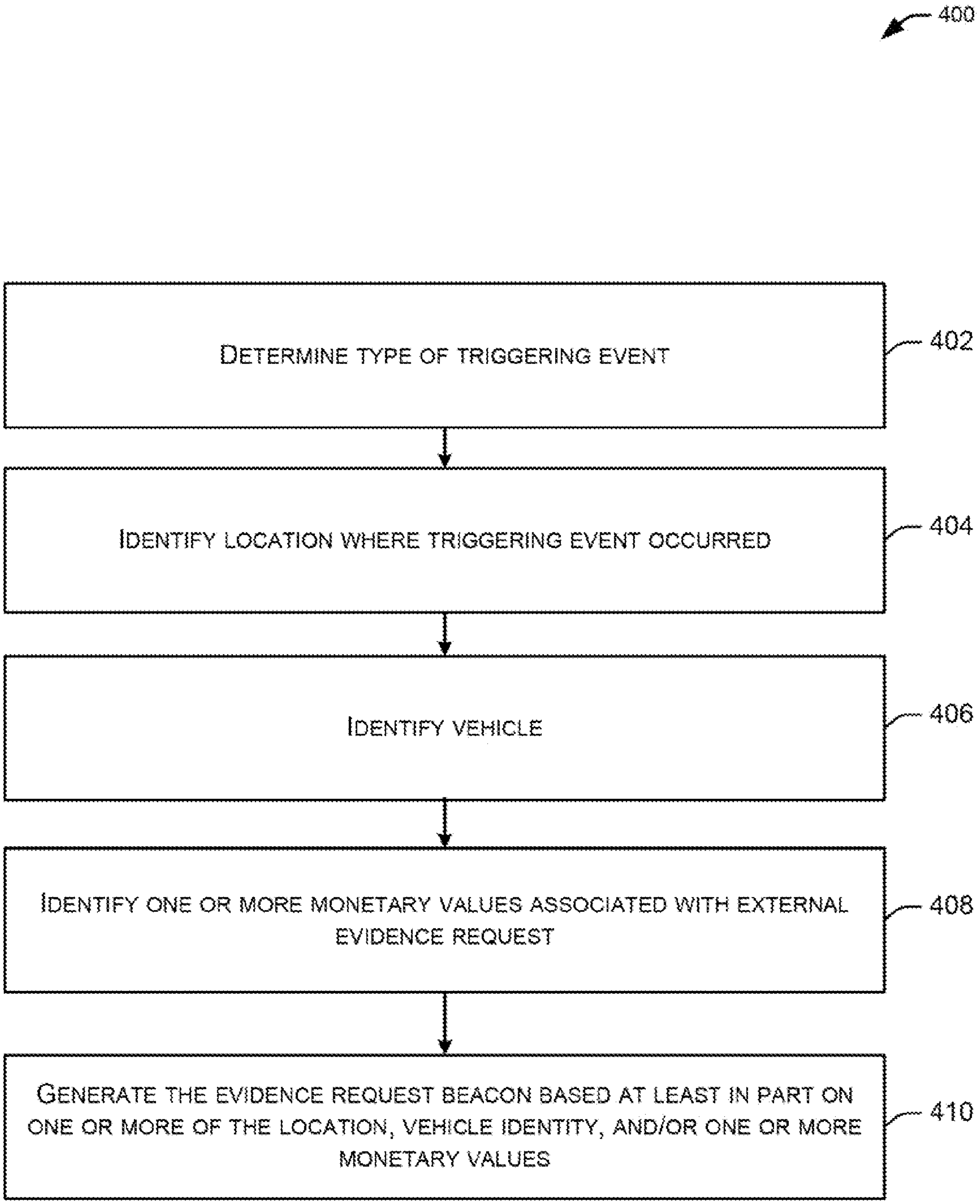
FIG. 4 is a flow diagram illustrating an example method for receiving external evidence elements and transferring payments in accordance with embodiments of the disclosure.

Referring now to FIG. 4, an example method 400 of generating an evidence request beacon in accordance with embodiments of the disclosure is discussed. The method 400 may be executed by the IVI system 201 and the processors 202 thereon in cooperation with other entities of the architecture 200. Method 400 may be an example implementation of block 306 of the method 300 of FIG. 3. At block 402, the type of triggering event may be determined. As stated earlier, the triggering event may include vehicle collision events, such as a rear collision, a front collision, and/or side collisions. In some cases, the collision may be with another vehicle 120, 130, 140. In other cases, the collision may be with a non-vehicle, such as a telephone pole and/or tree. A collision may be identified by the processors 202 from signals provided by a variety of sensors 126, 144, such as accelerometer sensors that may detect a collision from a rapid change in detected g-force, image sensors that may produce images that may be interpreted by the processors 202 to identify a collision, LIDAR signals that may indicate that the distance between two vehicles 120, 130, 140 indicates a collision, or the like. The type of triggering event may alternatively be a break-in and/or theft of the vehicle 120, 130, 140. As in the case of the collision, the break-in and/or theft may be identified from a variety of sensor signals. For example, forcible door and/or window entry sensor signals or sensors that indicate the bypass of the vehicle 120, 130, 140 ignition mechanism may be indicative of a break-in and/or theft of the vehicle 120, 130, 140. Other triggering events may include deployment of one or more air bags within the vehicles 120, 130, 140 or detection of structural damage to the vehicles 120, 130, 140.

At block 404, the location where the triggering event occurred may be identified. In one aspect, the processors 202 of the IVI system 201 may receive and/or analyze GPS data to ascertain the location of the triggering event occurrence. Alternatively location information may be ascertained using other mechanisms, such as inertial navigation sensors, such as accelerometers, from detected Wi-Fi access points (APs) and mappings of the same, or the like.

At block 406, the vehicle may be identified. The identification may be through a variety of mechanisms. For example, vehicles 120, 130, 140 may have a unique identifier, such as a string of alphanumeric characters associated therewith. In certain embodiments, the vehicle identifier may be a vehicle identification number (VIN). In the same or other embodiments, the vehicle identifier may be authentication credentials associated with a user, driver, and/or owner of the vehicle 120, 130, 140. Additionally, in certain embodiments, attributes of the vehicles 120, 130, 140 may be used and/or included as the primary or secondary identifiers of the vehicles 120, 130, 140. These attributes may include year, make, model, color, transmission, engine displacement/size, and/or trim of the vehicles 120, 130, 140.

At block 408, one or more monetary values associated with the external evidence request may be identified. These monetary values may be the amount of money that the requester may be willing to pay for evidence elements provided to it. The monetary values may be different for different types of evidence. For example, the amount of money offered for video or speed detection device evidence may be greater than for still picture evidence. The monetary values may vary further depending on the relevance and/or the quality of the evidence element. If the evidence element has a relatively more relevant content, then a greater monetary payment may be provided for the evidence element. For example, a clear image from a relatively good observational perspective and/or angle may result in a greater monetary compensation than a hazy picture that is not from a relatively ideal perspective and/or angle to capture many details of the triggering event.

At block 410, an evidence request beacon may be generated based at least in part on one or more of the location, vehicle identity, and/or one or more monetary values. In other words, the evidence request beacon may carry one or more of the information that is identified in process blocks 302, 304, 306, 308. The evidence request beacon may be in the form of one or more data packets and may be modulated onto any type of carrier signal. Further, the evidence request beacon may be transmitted either via hardwire or via wireless channels. For example, the evidence request beacon may be transmitted wirelessly via DSRC.

It should be noted that the method 400 may be modified in various ways in accordance with certain embodiments of the disclosure. For example, one or more operations of the method 400 may be eliminated or executed out of order in other embodiments of the disclosure. Additionally, other operations may be added to the method 400 in accordance with other embodiments of the disclosure.

Figure 5:
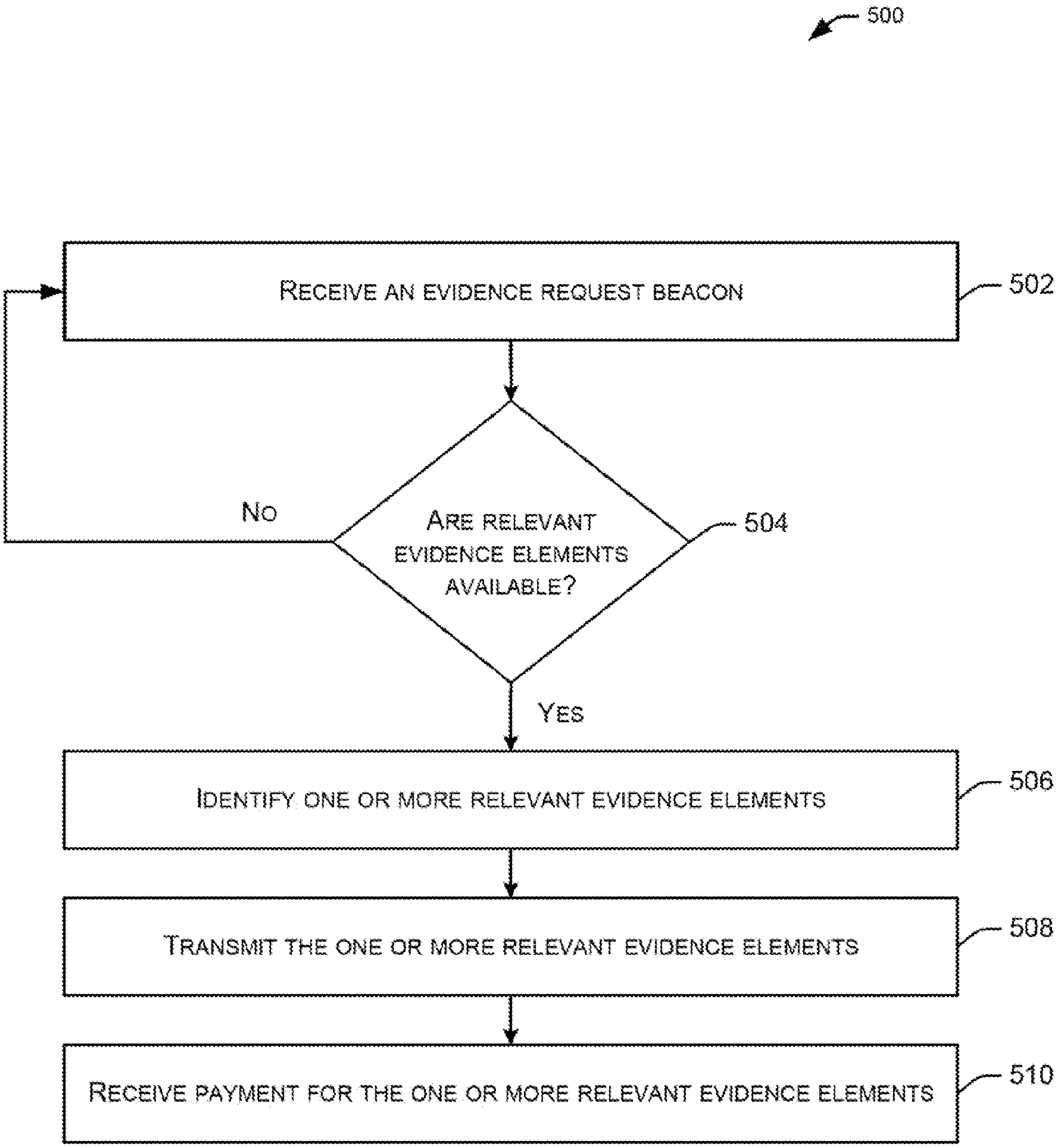
FIG. 5 is a flow diagram illustrating an example method for transmitting one or more evidence elements and receiving payment for the one or more evidence elements in accordance with certain embodiments of the disclosure.

Referring now to FIG. 5, an example method 500 for transmitting one or more evidence elements and receiving payment for the one or more evidence elements in accordance with certain embodiments of the disclosure is described. The method 500 may be performed by one of the other vehicles 120, 130, 140 or evidence systems 150 to transfer requested evidence elements to the requesting vehicles 120, 130, 140 and/or the remote servers 240. At block 502, an evidence request beacon may be received. As described with reference to FIGS. 3 and 4, the evidence request beacon may carry a variety of information associated with a triggering event. This information may include the type of triggering event, the location of the triggering event, the time of the triggering event, the angles and/or perspectives from which triggering event may be observed, identities of the vehicles 120, 130, 140 involved in the triggering event, monetary values offered for a variety of evidence elements, or the like. For example, the triggering event may be in the form of a collision 138. Upon receiving the evidence request beacon, the receiving vehicle 120, 130, 140 and/or the evidence system 150 may parse the evidence request beacon to identify the information associated with the triggering event. Upon extracting the relevant information from the evidence request beacon, the processors 222 may, in certain embodiments, store the event-related information, such as on the memory 230 or a remote storage location.

At block 504, it may be determined if the evidence elements available are potentially relevant. In one aspect, the evidence system 150 and/or other vehicles 120, 130, 140 may ascertain if the sensor data collected is potentially related to the triggering event and/or the vehicles 120, 130, 140 associated with the triggering event. In this case, the processors 222 may ascertain if evidence was collected at a time, location, and/or viewing angle that would be likely to provide evidence that may capture the triggering event. If it is relatively unlikely that evidence relevant to the triggering event was captured, then the method 500 may return to block 502 to await another evidence request beacon.

At block 504, if it is determined that relevant evidence elements may be available, then, at block 506, one or more relevant evidence elements may be identified. In one aspect, relevant evidence elements may be selected from a larger set of evidence elements based at least in part on the information provided on the evidence request beacon. For example, the processors 222 may select evidence that may correspond to a time window around the time when the triggering event occurred. Additionally, evidence may be selected that corresponds to a particular location and/or viewing angle from a larger body of collected evidence by the evidence system 150. For example, a portion corresponding to a window of time around the triggering event may be selected by the evidence system 150 and the processors 222 thereon as potentially relevant evidence elements.

At block 508, the one or more relevant evidence elements may be transmitted. The transmission may be by a variety of suitable protocols, channels, and/or mechanisms. The transmission may be via any one of DSRC, direct Wi-Fi, Bluetooth, Wi-Fi, or the like. In certain embodiments, the evidence may be provided directly to the requesting element, such as the IVI system 201. In the same or other embodiments, the one or more relevant evidence elements may be provided to the remote server 240. It may be advantageous to provide the evidence elements to the remote server 240 to defend against any potential allegations of tampering with the evidence elements.

At block 510, payment may be received for the one or more evidence elements. The payment received may be in accordance with a schedule of payments that may be provided by the IVI system 201 for particular types of evidence and/or particular relevance levels of the evidence elements provided. A credit transaction may be initiated for an account associated with the evidence system 150. The mechanism of funds transfer for the evidence elements may be by any suitable mechanism including, but not limited to, debit card, credit card, wire transfer, automated clearinghouse (ACH) transfer, or the like. In certain embodiments, the funds transfer for payment for the evidence elements may be initiated upon verification that the received evidence elements are relevant and/or useful for providing information about the associated triggering event.

In certain embodiments, the evidence system 150 and/or the processors 222 thereon may be configured to provide evidence to querying systems. For example, a police officer and/or other authority may be able to query the evidence system 150. Furthermore, an authority may be able to query the remote server 240 and/or the IVI system 201 for evidence elements.

It should be noted, that the method 500 may be modified in various ways in accordance with certain embodiments of the disclosure. For example, one or more operations of the method 500 may be eliminated or executed out of order in other embodiments of the disclosure. Additionally, other operations may be added to the method 500 in accordance with other embodiments of the disclosure.

Figure 6:
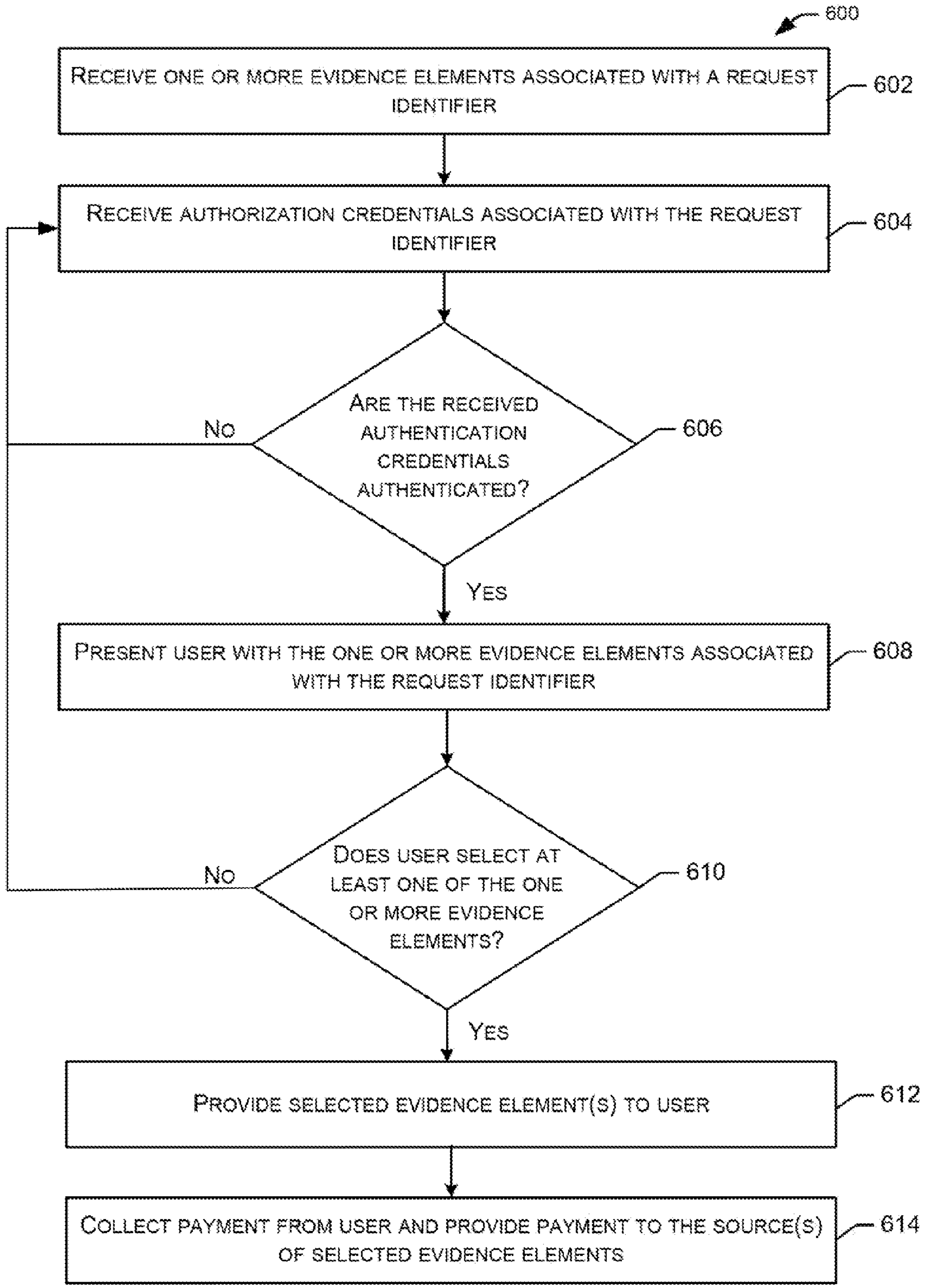
FIG. 6 is a flow diagram illustrating an example method for transacting one or more evidence elements in accordance with certain embodiments of the disclosure.

Referring now to FIG. 6, an example method for transacting one or more evidence elements in accordance with certain embodiments of the disclosure is described. Method 600 may be performed by the remote server 240 and the processors 242 thereon. At block 602, one or more evidence elements associated with a request identifier may be received. The request identifier may be an identifier of the requesting entity, such as an individual and/or vehicle associated with the triggering event that prompted receiving the one or more evidence elements. The request identifier may be an identifier that is linked to the received one or more evidence elements that are indicative of access rights to those received evidence elements. As discussed above, in certain embodiments, the request identifier may be the vehicle identification number (VIN) of the vehicles 120, 130, 140 associated with the triggering event and/or authentication credentials associated with a user requesting the evidence elements.

At block 604, authorization credentials associated with the request identifier may be received. The proper authorization credentials may allow a user to login and/or access the remote server 240. A logged in user may be able to access evidence elements that may be associated with the user. At block 606, it may be determined if the received authentication credentials are authenticated. The received authentication credentials may be compared to valid authentication credentials stored in a look-up table. Alternatively, a hash, such as a one-way hash, of the received authentication credential may be compared to hashes of valid authentication credentials stored in the look-up table. In one aspect, the authentication credentials may include a login and password. In other embodiments, the authentication credentials may include biometric data, such as fingerprint scans, retinal scans, voice sample, recognition, or the like. At block 606, if the received authentication credentials have not been authenticated, then the method 600 may return to block 604 to await receiving new authentication credentials.

If, however, at block 606, the received authentication credentials have been authenticated, then the method 600 may proceed to block 608, where the one or more evidence elements associated with the request identifier may be presented to the user. In this case, both the user and the evidence elements may be linked via a common request identifier. Therefore, the common request identifier may be the mechanism by which the remote server 240 and the processors 242 thereon recognize the currently logged in user as associated with the received one or more evidence elements. In certain embodiments, the evidence elements associated with the request identifier may be presented to the user online and/or over the Internet. The user may be able to hear or view a preview of the evidence elements.

At block 610, it may be determined if the user selects at least one of the one or more evidence elements. The user may evaluate the evidence elements to determine if they are relevant. If they are not relevant to the triggering event, then the user may be inclined to not select any of the evidence elements. If the user does not select any of the evidence elements, then the method 600 may return to block 604 to receive a new set of authentication credentials. If, however, the user selects one or more of the one or more evidence elements, then, at block 612, the selected evidence elements may be provided to the user. Providing the selected evidence elements may entail transmitting the evidence elements via the networks 220 or other suitable communicative links to a user device associated with the user or to the IVI system 201 associated with the evidence request message. At block 614, payment may be collected from the user, and the payments may be distributed to the sources of the selected evidence elements.

It should be noted that the method 600 may be modified in various ways in accordance with certain embodiments of the disclosure. For example, one or more operations of the method 600 may be eliminated or executed out of order in other embodiments of the disclosure. Additionally, other operations may be added to the method 600 in accordance with other embodiments of the disclosure.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The one or more tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include one or more suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising:

identifying, by one or more processors associated with a vehicle, a triggering event associated with the vehicle;

determining, by the one or more processors, at least one information element associated with the triggering event;

generating, by the one or more processors, an evidence request beacon based at least in part on the at least one information element, wherein the evidence request beacon carries a request for one or more entities external to the vehicle to provide evidence elements, wherein the evidence elements comprise at least one of: (i) still images, (ii) video, (iii) audio, (iv) speed information, or (v) acceleration information; and transmitting the evidence request beacon at or near the time of the triggering event for receipt by the one or more entities external to the vehicle.

2. The method of claim 1, further comprising receiving, by the one or more processors, one or more first evidence elements responsive to identifying the triggering event.

3. The method of claim 2, wherein the one or more first evidence elements are received from one or more sensors disposed on the vehicle.

4. The method of claim 1, wherein the triggering event comprises at least one of: (i) an accident involving the vehicle; (ii) a break-in of the vehicle; (iii) a theft of the vehicle; (iv) a rapid deceleration of the vehicle; (v) structural damage of the vehicle; or (vi) deployment of an air bag associated with the vehicle.

5. The method of claim 1, wherein the at least one information element associated with the triggering event comprises at least one of: (i) identification of the vehicle; (ii) identification of an owner of the vehicle; (iii) identification of a driver of the vehicle; (iv) identification of a user of the vehicle; (v) indication of a type of triggering event; (vi) a location associated with the triggering event; (vii) a viewing angle associated with the triggering event; (viii) time associated with the triggering event; or (ix) one or more monetary values.

6. The method of claim 1, further comprising receiving one or more second evidence elements responsive to transmitting the evidence request beacon.

7. The method of claim 6, further comprising instantiating a monetary payment responsive to receiving the one or more second evidence elements.

8. A system, comprising:

one or more sensors;

one or more antennas; and one or more processors configured to:

identify a triggering event associated with a vehicle;

receive one or more first data elements from the one or more sensors responsive to identifying the triggering event;

determine at least one information element associated with the triggering event;

generate an evidence request beacon based at least in part on the at least one information element, wherein the evidence request beacon carries a request for one or more entities external to the vehicle to provide evidence elements, wherein the evidence elements comprise at least one of: (i) still images, (ii) video, (iii) audio, (iv) speed information, or (v) acceleration information; and transmit the evidence request beacon via the one or more antennas at or near the time of the triggering event for receipt by the one or more entities external to the vehicle.

9. The system of claim 8, wherein the triggering event comprises at least one of: (i) an accident involving the vehicle; (ii) a break-in of the vehicle; (iii) a theft of the vehicle; (iv) a rapid deceleration of the vehicle; (v) structural damage of the vehicle; or (vi) deployment of an air bag associated with the vehicle.

10. The system of claim 8, wherein the at least one information element associated with the triggering event comprises at least one of: (i) identification of the vehicle; (ii) identification of an owner of the vehicle; (iii) identification of a driver of the vehicle; (iv) identification of a user of the vehicle; (v) indication of a type of triggering event; (vi) a location associated with the triggering event; (vii) a viewing angle associated with the triggering event; (viii) time associated with the triggering event; or (ix) one or more monetary values.

11. The system of claim 8, wherein the one or more processors are further configured to receive one or more second evidence elements responsive to transmitting the evidence request beacon.

12. The system of claim 11, wherein the one or more processors are further configured to instantiate a monetary payment responsive to receiving the one or more second evidence elements.

13. One or more non-transitory computer-readable media comprising computer-executable instructions that, when executed by one or more processors, configure the one or more processors to:

identify a triggering event associated with a vehicle;

receive one or more first data elements from the one or more sensors responsive to identifying the triggering event;

determine at least one information element associated with the triggering event;

generate an evidence request beacon based at least in part on the at least one information element, wherein the evidence request beacon carries a request for one or more entities external to the vehicle to provide evidence elements, wherein the evidence elements comprise at least one of: (i) still images, (ii) video, (iii) audio, (iv) speed information, or (v) acceleration information; and transmit the evidence request beacon via the one or more antennas at or near the time of the triggering event for receipt by the one or more entities external to the vehicle.

14. The non-transitory computer-readable media of claim 13, wherein the one or more processors are configured further to receive one or more second evidence elements responsive to transmitting the evidence request beacon.

15. The non-transitory computer-readable media of claim 14, wherein the one or more processors are configured further to instantiate a monetary payment responsive to receiving the one or more second evidence elements.

16. A method, comprising:

receiving, by one or more processors and from a vehicle, an evidence request beacon, wherein the evidence request beacon carries a request for evidence elements;

determining, by the one or more processors and based at least in part on the evidence request beacon, at least one information element associated with a triggering event associated with the vehicle;

identifying, by the one or more processors, one or more evidence elements associated with the triggering event based at least in part on the at least one information element, wherein the one or more evidence elements comprise at least one of: (i) still images, (ii) video, (iii) audio, (iv) speed information, or (v) acceleration information; and transmitting, in response to receiving the evidence request beacon, the one or more evidence elements.

17. The method of claim 16, wherein the triggering event comprises at least one of: (i) an accident involving a vehicle; (ii) a break-in of a vehicle; (iii) a theft of a vehicle; (iv) a rapid deceleration of a vehicle; (v) structural damage of a vehicle; or (vi) deployment of an air bag associated with a vehicle.

18. The method of claim 17, wherein the at least one information element associated with the triggering event comprises at least one of: (i) identification of a vehicle; (ii) identification of an owner of a vehicle; (iii) identification of a driver of a vehicle; (iv) identification of a user of a vehicle; (v) indication of a type of triggering event; (vi) a location associated with the triggering event; (vii) a viewing angle associated with the triggering event; (viii) time associated with the triggering event; or (ix) one or more monetary values.

19. A system, comprising:

one or more sensors;

one or more communicative links; and one or more processors configured to:

receive one or more evidence elements from the one or more sensors, wherein the one or more evidence elements comprise at least one of: (i) still images, (ii) video, (iii) audio, (iv) speed information, or (v) acceleration information;

receive, from a vehicle, an evidence request beacon via the one or more communicative links, wherein the evidence request beacon carries a request for evidence elements;

determine, based at least in part on the evidence request beacon, at least one information element associated with a triggering event;

identify at least one of the one or more evidence elements that is associated with the triggering event based at least in part on the at least one information element; and transmit, in response to receiving the evidence request beacon, the at least one of the one or more evidence elements associated with the triggering event via the one or more communicative links.

20. The system of claim 19, wherein the triggering event comprises at least one of: (i) an accident involving a vehicle; (ii) a break-in of a vehicle; (iii) a theft of a vehicle; (iv) a rapid deceleration of a vehicle; (v) structural damage of a vehicle; or (vi) deployment of an air bag associated with a vehicle.

21. The system of claim 19, wherein the at least one information element associated with the triggering event comprises at least one of: (i) identification of a vehicle; (ii) identification of an owner of a vehicle; (iii) identification of a driver of a vehicle; (iv) identification of a user of a vehicle; (v) indication of a type of triggering event; (vi) a location associated with the triggering event; (vii) a viewing angle associated with the triggering event; (viii) time associated with the triggering event; or (ix) one or more monetary values.

22. One or more non-transitory computer-readable media comprising computer-executable instructions that, when executed by one or more processors, configure the one or more processor to:

receive one or more evidence elements from one or more sensors, wherein the one or more evidence elements comprise at least one of: (i) still images, (ii) video, (iii) audio, (iv) speed information, or (v) acceleration information;

receive, from a vehicle, an evidence request beacon via one or more communicative links, wherein the evidence request beacon carries a request for evidence elements associated with a triggering event associated with the vehicle;

determine, based at least in part on the evidence request beacon, at least one information element associated with the triggering event;

identify at least one of the one or more evidence elements that is associated with the triggering event based at least in part on the at least one information element; and transmit, in response to receiving the evidence request beacon, the at least one of the one or more evidence elements associated with the triggering event via the one or more communicative links.

23. The non-transitory computer-readable media of claim 22, wherein the triggering event comprises at least one of: (i) an accident involving a vehicle; (ii) a break-in of a vehicle; (iii) a theft of a vehicle; (iv) a rapid deceleration of a vehicle; (v) structural damage of a vehicle; or (vi) deployment of an air bag associated with a vehicle.

* * * * *